United States Patent
Nakamura et al.

(10) Patent No.: US 6,537,617 B2
(45) Date of Patent: Mar. 25, 2003

(54) MANUFACTURING METHOD OF CERAMIC MATRIX COMPOSITE

(75) Inventors: Takeshi Nakamura, Nerima-ku (JP); Shunsuke Satomi, Oosaka-sayama (JP); Hiroshige Murata, Funabashi (JP)

(73) Assignee: Ishikawajima-Harima Heavy Industries Co., Ltd. (JP)

( * ) Notice: Subject to any disclaimer, the term of this patent is extended or adjusted under 35 U.S.C. 154(b) by 0 days.

(21) Appl. No.: 09/849,998

(22) Filed: May 8, 2001

(65) Prior Publication Data

US 2001/0046563 A1 Nov. 29, 2001

(30) Foreign Application Priority Data

May 26, 2000 (JP) .......................... 2000/156509

(51) Int. Cl.[7] .............. B05D 3/02; B05D 1/18
(52) U.S. Cl. ............... 427/376.2; 427/294; 427/379; 427/443.2
(58) Field of Search ............. 427/294, 376.2, 427/443.2, 379

(56) References Cited

U.S. PATENT DOCUMENTS

| | | | | |
|---|---|---|---|---|
| 5,028,363 A | * | 7/1991 | Nishio et al. ............ | 264/28 |
| 5,395,572 A | * | 3/1995 | Brotz ..................... | 264/43 |
| 5,698,143 A | * | 12/1997 | Tani et al. ............. | 264/29.1 |
| 6,024,898 A | * | 2/2000 | Steibel et al. .......... | 264/29.1 |
| 6,316,048 B1 | * | 11/2001 | Steibel et al. .......... | 427/180 |

FOREIGN PATENT DOCUMENTS

| JP | 08-081275 A | 3/1996 |
|---|---|---|
| JP | 08 081275 A | 3/1996 |

OTHER PUBLICATIONS

123rd Committee, vol. 40, No. 3, Toshiba PCI, "Development of Reaction-Sintered Silicon Carbide Matrix Long Fiber Composite", Akiko Suyama et al., pp. 403–408, No date provided.

* cited by examiner

Primary Examiner—Michael Barr
(74) Attorney, Agent, or Firm—Griffin & Szipl, P.C.

(57) ABSTRACT

There is disclosed a method of mixing/dispersing solid phases of a carbon powder 4 and silicon powder 5, impregnating a woven fiber 2 with the powders, and subsequently exposing the woven fiber to a high temperature sufficient for reaction calcining to react/calcine the woven fiber, so that only small amounts of C and Si particles remain, a matrix forming speed is high, and CMC having high airtightness can be manufactured in a short time.

11 Claims, 5 Drawing Sheets

Si powder before mixing/grinding

C powder before mixing/grinding

Powder after mixing/grinding
(rotating mill 12 Hr)

After impregnating,
reaction calcining

Fig.5A Before reaction
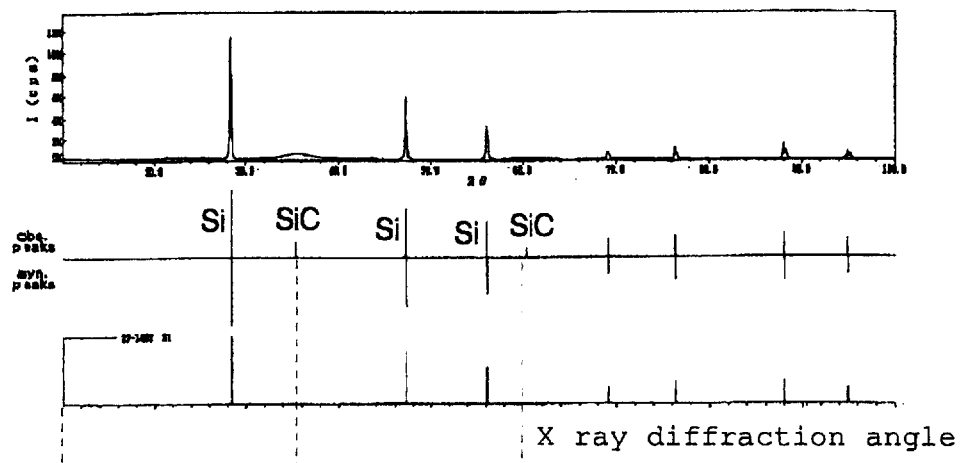
Fig.5B After reaction
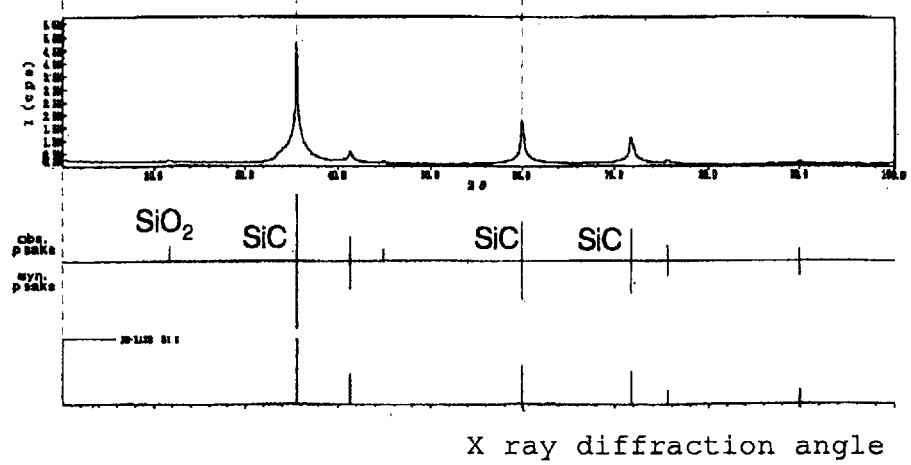

MANUFACTURING METHOD OF CERAMIC MATRIX COMPOSITE

BACKGROUND OF THE INVENTION

1. Field of the Invention

The present invention relates to a manufacturing method of a ceramic matrix composite which is small in residual amounts of C and Si particles and high in airtightness.

2. Description of Related Art

To enhance performance of a rocket engine in which propellants such as $NTO/N_2H_4$ and NTO/MMH are used, it has been desired to raise a heat-resistant temperature of a combustor (thrust chamber). Therefore, a niobium alloy with a coating having a heat-resistant temperature of about 1500° C. has heretofore been used as a chamber material for many rocket engines. However, this material is highly dense and heavy, a high-temperature strength of the material is low, and the coating has a short life.

On the other hand, ceramic has a high heat-resistance, but is disadvantageously brittle. Therefore, a ceramic matrix composite (hereinafter refered as CMC) reinforced with a ceramic fiber has been developed. That is, the ceramic matrix composite (CMC) is constituted of ceramic fiber and ceramic matrix. Additionally, the CMC is generally indicated as ceramic fiber/ceramic matrix by materials thereof. For example, when both materials are SiC, SiC/SiC is indicated.

Since the CMC is lightweight and has a high-temperature strength, the CMC is a remarkably promising material not only for the aforementioned rocket engine combustor (thrust chamber), but also for a high-temperature section fuel piping, jet engine turbine blade, combustor, afterburner component, and the like.

However, the conventional CMC has a problem that airtightness cannot be held, and thermal shock resistance is low. That is, for the conventional CMC, after a predetermined shape is constituted by a ceramic fiber, a matrix is formed in a fiber gap in a so-called chemical vapor infiltration method (CVI method). However, the CVI method has a problem that it takes an impracticably long period (e.g., one year or more) to completely fill the gaps among the fibers.

Moreover, to enhance the airtightness itself of the CMC, a polymer impregnate and pyrolysis method (PIP method) of simply impregnating a component of the ceramic fiber with molten material polymer and calcining the component is effective. However, since it is necessary to repeat an impregnating/calcining cycle many times (e.g., 40 or more times), the method is inefficient.

On the other hand, as an alternative CMC manufacturing method to the aforementioned CVI and PIP methods, a reaction sintering method (RS method) has locally been proposed (e.g., Japanese Patent Application Laid-Open No. 81275/1996 titled "Manufacturing Method of SiC Matrix Fiber Composite").

This method includes: forming the ceramic fiber into a three-dimensional structure having a predetermined shape; impregnating the three-dimensional structure with a starting raw material which contains silicon and carbon sources and forming a molded material having the predetermined shape; heating the resulting molded material in vacuum or inactive gas atmosphere at a temperature less than a silicon melting point, simultaneously pressurizing the molded material and reacting/sintering silicon and carbon to form an SiC matrix; and densifying the matrix.

FIG. 1 is a manufacturing process flow diagram of an SiC matrix long fiber composite by a reaction sintering method disclosed in "Development of Reaction-Sintered Silicon Carbide Matrix Long Fiber Composite" (the $123^{rd}$ committee presentation of results of a research on a heat-resistant metal material, Vol. 40, No. 3).

As shown in FIG. 1, in the RS method, an SiC fiber 1 coated with BN/SiC is braided on a monofilament surface, and a fiber preform 2 (three-dimensional structure) is formed. On the other hand, an SiC powder, C powder, dispersant, and water are compounded/mixed to form a matrix casting slurry 3. Subsequently, the fiber preform 2 is pressure-impregnated and cast with the matrix slurry 3. Finally, a green composite is heated at 1723 K in a vacuum furnace, impregnated with molten Si and reacted/sintered to complete a CMC.

However, the aforementioned RS method has a problem, in principle, that unreacted C and Si particles remain. That is, in the RS method, the fiber preform 2 is pressure-impregnated with the slurry 3 containing the SiC and C powder, subsequently the preform is heated at a temperature (e.g., 1723 K) which is not less than a silicon melting point (Si melting point is about 1683 K), and Si melting impregnation and reaction sintering are performed. However, during Si melting impregnation, excess Si remains. Another problem is that strength is considerably deteriorated during operation at the Si melting point or higher temperatures. Moreover, when an amount of Si is reduced during Si melting impregnation in order to avoid the problem, conversely C particles remain. This results in a problem that the strength is deteriorated by oxidation.

SUMMARY OF THE INVENTION

The present invention has been developed to solve the aforementioned problem. That is, an object of the present invention is to provide a manufacturing method of a ceramic matrix compound, in which only small amounts of C and Si particles remain, a matrix forming speed is high, and CMC having a high airtightness can be manufactured in a short time.

According to the present invention, there is provided a manufacturing method of a ceramic matrix composite, including steps of: mixing/dispersing a carbon powder (4) and a silicon powder (5) in solid phases; impregnating a woven fiber (2) with the powders; and subsequently exposing the woven fiber to a high temperature sufficient for reaction calcining to react/calcine the woven fiber.

Moreover, according to the present invention, a method includes: a mixing/dispersing step (13) of mixing/dispersing a carbon powder (4) and a silicon powder (5) in solid phases; a slurrying step (14) of adding a solvent and dispersant to a mixed/dispersed powder mixture to manufacture a slurry (8); an impregnating step (16) of impregnating a woven fiber (2) formed of an SiC fiber (1) with the slurry; and a reaction calcining step (18) of exposing the woven fiber resulting from the impregnating step to a high temperature sufficient for reaction calcining, and reacting/calcining the woven fiber to form a matrix portion.

According to the method of the present invention, the Si and C particles are uniformly dispersed/mixed beforehand with a ball mill, and the like, and the woven fiber is impregnated with the uniformly dispersed powder mixture and subsequently reacted/calcined so that an SiC matrix having no unreacted particle can be formed. That is, since SiC generation/reaction occurs in a uniformly dispersed state of the mixed/ground fine Si and C particles, no unreacted particle remains and reaction is easily controlled. Therefore, since this method is less troublesome than the conventional method, a manufacturing period can be shortened and cost can be reduced. Moreover, since the reaction calcining is performed in the vicinity of a silicon melting point at a sufficiently lowered temperature rise rate, a CMC having a high airtightness can be manufactured without leaving outflow of molten Si, or unreacted Si, C elements in the matrix.

According to a preferred embodiment of the present invention, the method includes a vacuum defoaming step (15) of reducing a pressure of the slurry (8) and removing a mixed gas after the slurrying step (14). By this vacuum defoaming step the mixed gas contained in the slurry is removed beforehand, and in the impregnating step (16) a filling ratio of particle mixture of Si and C particles can be enhanced.

Moreover, the method includes a tentative calcining step (17) of drying the woven fiber impregnated with the slurry and tentatively calcining the woven fiber at a temperature lower than the silicon melting point after the impregnating step (16). By this tentative calcining step the solvent and dispersant in the slurry are removed beforehand, and the reaction in the reaction calcining step (18) can efficiently be performed.

Other objects and advantageous features of the present invention will be apparent upon reading the following description with reference to the accompanying drawings.

BRIEF DESCRIPTION OF THE DRAWINGS

FIG. 5A and FIG. 5B show a composition analysis result by X-ray diffraction before and after reaction calcining.

DETAILED DESCRIPTION OF THE PREFERRED EMBODIMENT

A preferred embodiment of the present invention will be described hereinafter with reference to the drawings.

Figure 1:
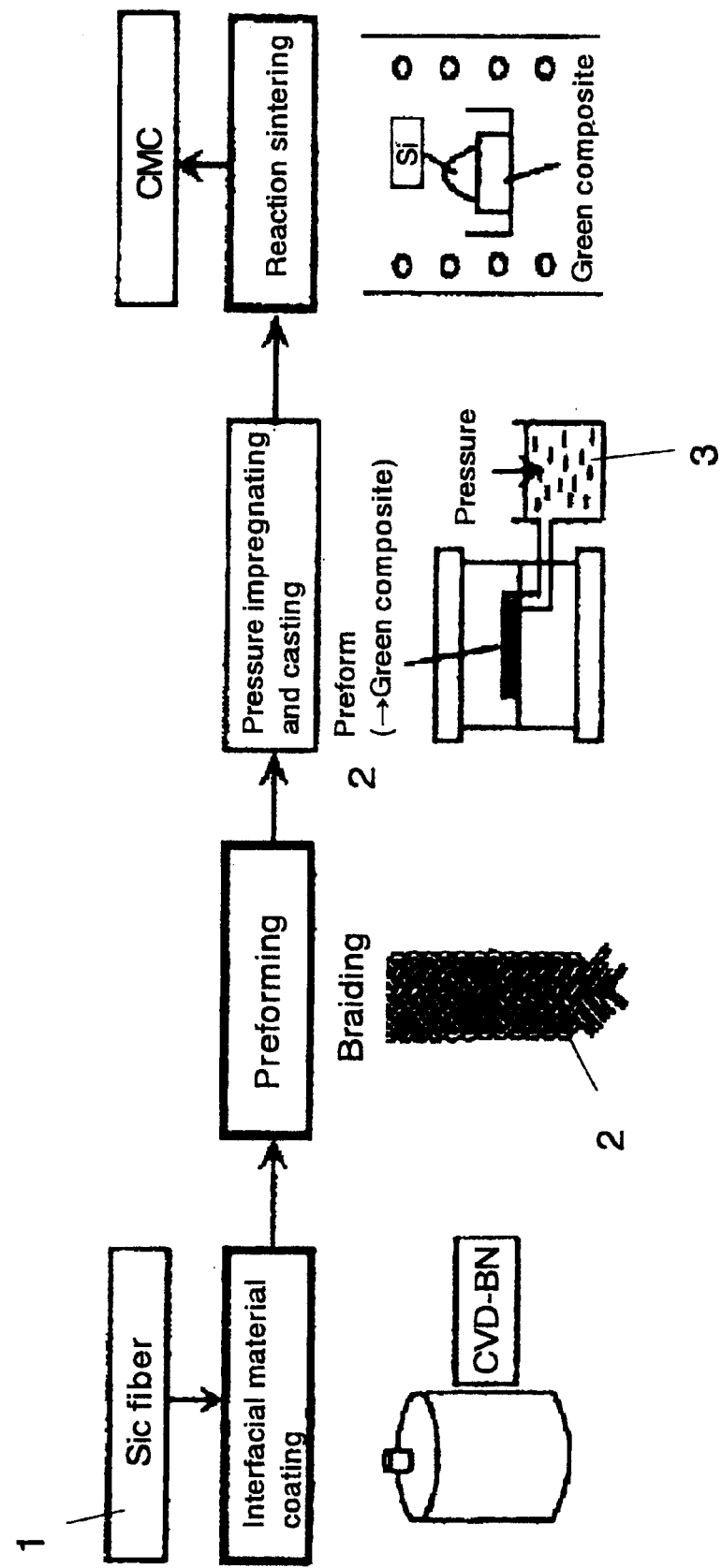
FIG. 1 is a schematic flow diagram of a conventional reaction sintering method.
Figure 2:
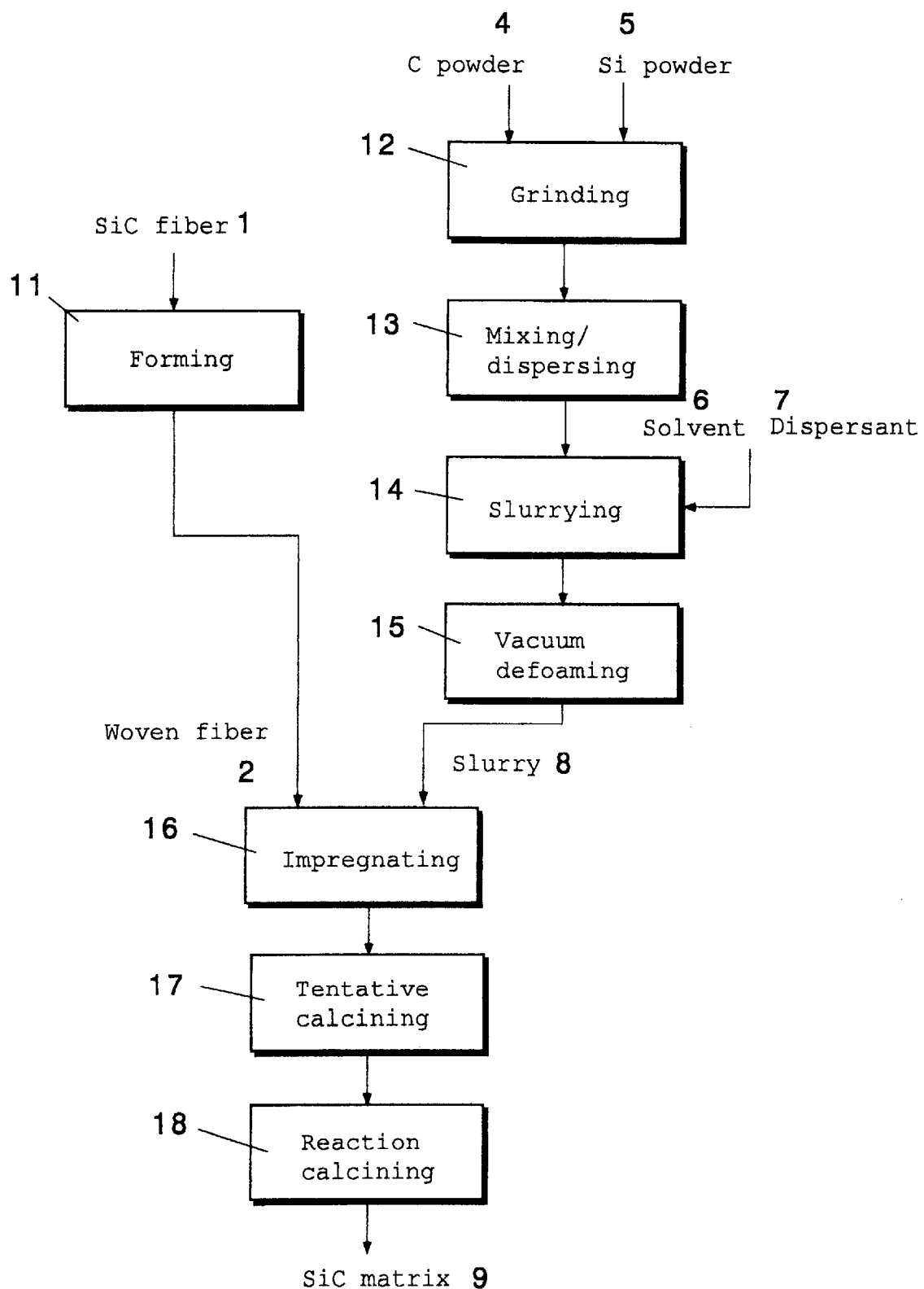
FIG. 2 is a flow diagram showing a manufacturing method of a ceramic matrix composite of the present invention.

FIG. 2 is a flow diagram showing a manufacturing method of a ceramic matrix composite of the present invention. As shown in FIG. 2, the method of the present invention includes a forming step 11, grinding step 12, mixing/dispersing step 13, slurrying step 14, vacuum defoaming step 15, impregnating step 16, tentative calcining step 17, and reaction calcining step 18.

In the forming step 11, an SiC fiber 1 is used to form a woven fiber 2 having a predetermined shape. The shape to be formed is preferably a solid shape suitable not only for a rocket engine combustor (thrust chamber) to which the present invention is applied, but also for a high-temperature section fuel piping, turbine blade, combustor, afterburner component, and the like.

In the grinding step 12 and mixing/dispersing step 13, for example, a ball mill is used to mix/disperse a carbon powder 4 and a silicon powder 5 in solid phases. In these steps, the carbon powder 4 is preferably mixed with the silicon powder 5 by an equal mol number. Additionally, an apparatus other than the ball mill may be used to separately perform the grinding step 12 and mixing/dispersing step 13.

In the slurrying step 14, a solvent and dispersant are added to a powder mixture mixed/dispersed in the mixing/dispersing step 13 to manufacture a slurry 8. For example, ethanol is used in the solvent, and the powder mixture is dispersed in ethanol by 50 to 70 wt %. Furthermore, for example, polyethylene-imine is added as the dispersant by 1 wt %.

In the vacuum defoaming step 15, the slurry 8 manufactured in the slurrying step 14 is reduced in pressure in a vacuum container and a mixed gas is removed. This pressure reduction/defoaming is performed, for example, for about 10 to 15 minutes.

In the impregnating step 16, the woven fiber 2 formed of the SiC fiber 1 is immersed in the slurry 8 prepared in the vacuum defoaming step 15, and the woven fiber 2 is impregnated with the slurry 8. The impregnation can be performed under atmospheric pressure, but vacuum impregnation or pressure impregnation may be performed if necessary.

In the tentative calcining step 17, the woven fiber 2 impregnated with the slurry 8 is dried in a vacuum drier, for example, at a low temperature of 60 to 100° C. for about 24 hours so that ethanol in the slurry is decomposed/removed. Subsequently, the woven fiber is allowed to stand in an atmospheric pressure state at about 60° C. for about eight hours, and subsequently tentatively calcined in an argon gas at about 1000° C. for one to two hours. By this tentative calcining step 17, the solvent and dispersant in the slurry are completely removed beforehand.

In the reaction calcining step 18, the woven fiber subjected to the impregnating step is exposed to a high temperature sufficient for reaction calcining, and thereby reacted/calcined to form a matrix portion. For temperature rise, temperature is slowly (e.g., 0.5 to 1° C./min) raised, for example, around a silicon melting point (1414° C.). Thereafter, the temperature (e.g., about 1420° C.) slightly higher than the silicon melting point is held for about two hours, and the temperature is then lowered. By the reaction calcining step 18, SiC generation/reaction occurs in a uniformly dispersed state of the mixed/ground ultrafine Si and C particles. Therefore, no unreacted particle remains and reaction is easily controlled. Moreover, the reaction calcining is performed while the temperature is raised to be higher than the silicon melting point. Therefore, a reaction speed of C particles with Si is high, and the CMC having a high airtightness can be manufactured in a short time.

EXAMPLE

An example of the aforementioned method of the present invention will be described hereinafter.

Figure 3A:
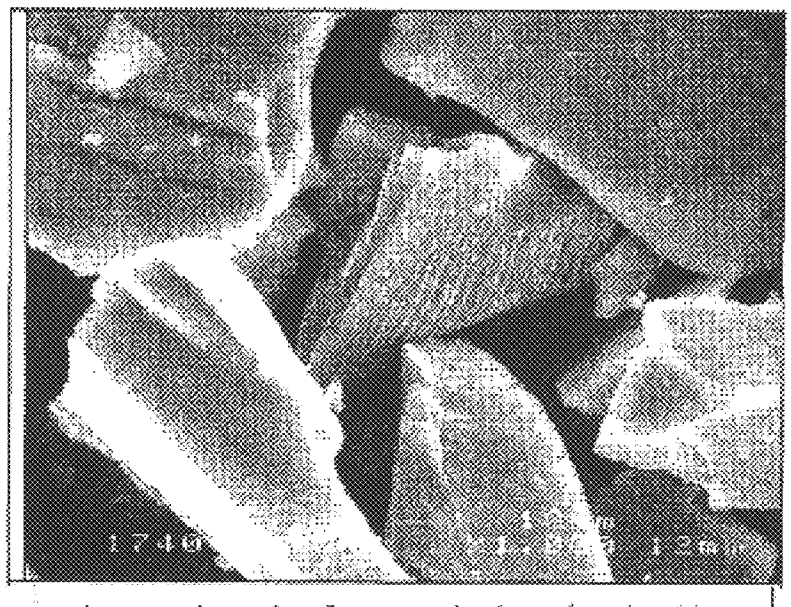
FIG. 3A and FIG. 3B are microscope photographs of a raw material powder according to the present invention.
Figure 3B:
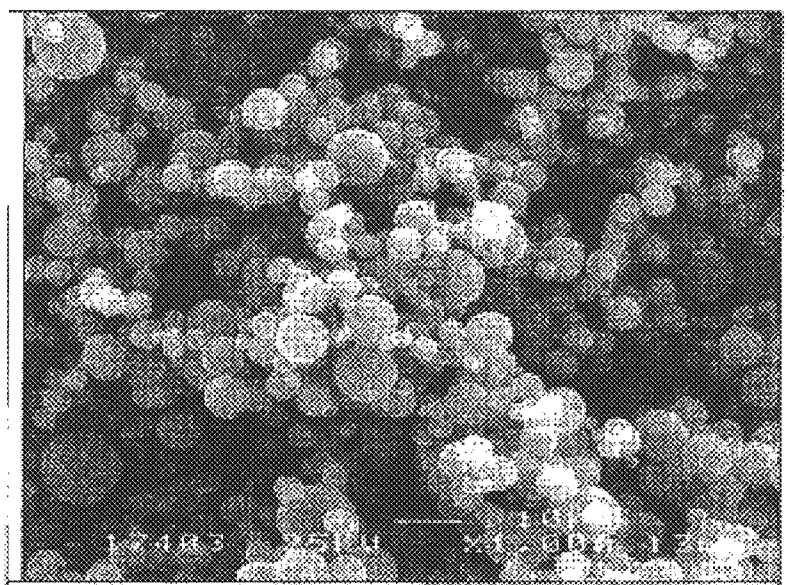

FIG. 3A and FIG. 3B are microscope photographs (about 1000 magnifications) of a material powder before reaction according to the present invention. In the drawings, FIG. 3A shows Si powder before mixing/grinding, and FIG. 3B shows C powder before mixing/grinding. It is seen that the Si powder (FIG. 3A) includes relatively large particles having an average particle diameter of 70 to 100 μm, and that the C powder (FIG. 3B) includes fine particles having an average particle diameter of 1 to 10 μm.

Figure 4A:
FIG. 4A and FIG. 4B are microscope photographs of a powder mixture and CMC according to the present invention.
Figure 4B:
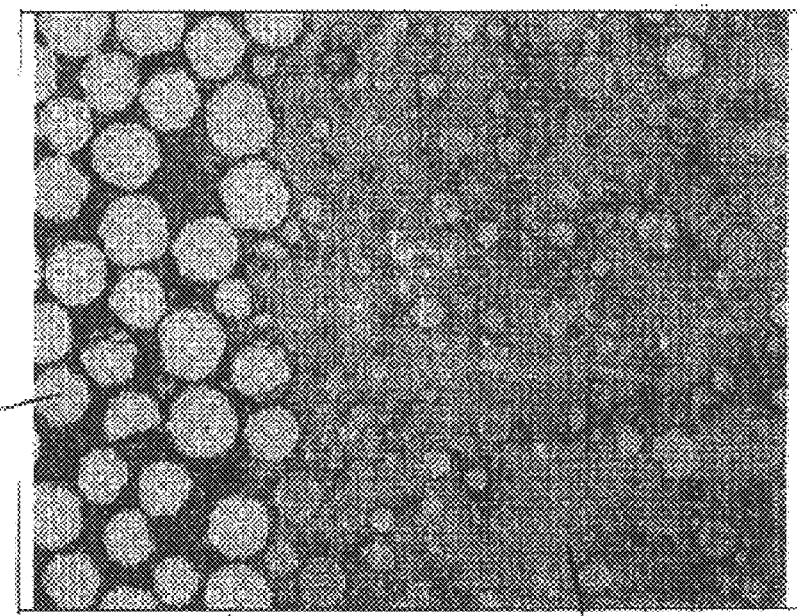

FIG. 4A and FIG. 4B are microscope photographs (about 1000 magnifications) of the powder mixture and CMC according to the present invention. In the drawings, FIG. 4A shows a powder mixed/ground using the ball mill (after the steps 12, 13), and FIG. 4B shows CMC after impregnating/reaction calining (after the steps 16 to 18).

It is seen from FIG. 4A that both the Si powder and the C powder are pulverized in an average particle diameter of several micrometers by grinding/mixing/dispersing with the ball mill, and are mutually and uniformly mixed/dispersed.

Moreover, it is seen from FIG. 4B that a dense SiC matrix 9 is formed in the close vicinity of the SiC fiber 1 having a diameter of about 11 μm.

FIG. 5A and FIG. 5B show a composition analysis result by X-ray diffraction before and after reaction calcining. In the drawings, FIG. 5A shows a state before reaction calcining, FIG. 5B shows a state after reaction calcining, the abscissa indicates an X ray diffraction angle, and longitudinal lines in the drawings indicate peak positions for compositions (Si, SiC, $SiO_2$).

It is seen from comparison of FIG. 5A with FIG. 5B that a main component before reaction calcining (FIG. 5A) is Si, a main component after the reaction calcining (FIG. 5B) is SiC, Si hardly remains after the reaction calcining (FIG. 5B), and a slight amount of $SiO_2$ exists.

As described above, according to the method of the present invention, the Si and C particles are uniformly dispersed/mixed beforehand with the ball mill, and the like, the woven fiber is impregnated with the uniformly dispersed powder mixture and subsequently reacted/calcined so that the SiC matrix having no unreacted particle can be formed. That is, since SiC generation/reaction occurs in the uniformly dispersed state of the mixed/ground fine Si and C particles, no unreacted particle remains and reaction is easily controlled. Therefore, since this method is less troublesome than the conventional method, a manufacturing period can be shortened and cost can be reduced. Moreover, since the reaction calcining is performed in the vicinity of the silicon melting point at a sufficiently lowered temperature rise rate, the CMC having a high airtightness can be manufactured without leaving outflow of molten Si, or unreacted Si, C elements in the matrix.

As described above, the manufacturing method of the ceramic matrix composite of the present invention produces superior effects that only slight amounts of C and Si particles remain, matrix forming speed is high, and CMC having high airtightness can be manufactured in a short time.

Additionally, the present invention is not limited to the aforementioned embodiment, and can of course be modified in various manners without departing from the scope of the present invention.

What is claimed is:

1. A manufacturing method of a ceramic matrix composite, comprising the steps of:
   mixing/dispersing a carbon powder and a silicon powder in solid phases to provide a powder mixture;
   impregnating a woven fiber with the powder mixture; and
   subsequently exposing the woven fiber to a high temperature sufficient for reaction calcining to react/calcine the woven fiber.

2. A manufacturing method of a ceramic matrix composite comprising:
   mixing/dispersing a carbon powder and a silicon powder in solid phases to provide a powder mixture;
   adding a solvent and a dispersant to the powder mixture to manufacture a slurry;
   impregnating a woven fiber formed of an SiC fiber with the slurry; and
   exposing the woven fiber resulting from the step of impregnating to a high temperature sufficient for reaction calcining, and reacting/calcining the woven fiber to form a matrix portion.

3. The manufacturing method of the ceramic matrix composite according to claim 2, further comprising step of reducing a pressure of the slurry then impregnating the woven fiber with the slurry.

4. The manufacturing method of the ceramic matrix composite according to claim 2, further comprising a step of drying the woven fiber impregnated with the slurry and tentatively calcining the woven fiber at a temperature lower than a silicon melting point after said impregnating step.

5. The manufacturing method of the ceramic matrix composite according to claim 2, further comprising a step of pulverizing both the carbon powder and the silicon powder to an average particle diameter of several micrometers before said mixing/dispersing step, wherein a ball mill is used for the grinding step and the mixing/dispersing step.

6. The manufacturing method of the ceramic matrix composite according to claim 2, wherein a temperature rising is slowly controlled under 1 degree C./min for the reaction calcinating step at or about the silicon melting point.

7. The manufacturing method of a ceramic matrix composite as recited in claim 1, further comprising the step of: adding a solvent and a dispersant to the powder mixture to manufacture a slurry so that impregnating the woven fiber is performed with the powder mixture in the slurry.

8. The manufacturing method of a ceramic matrix composite as recited in claim 7, further comprising the step of: reducing a pressure of the slurry then impregnating the woven fiber with the slurry.

9. The manufacturing method of a ceramic matrix composite as recited in claim 7, further comprising the step of: drying the woven fiber impregnated with the slurry and tentatively calcining the woven fiber at a temperature lower than a silicon melting point.

10. The manufacturing method of a ceramic matrix composite as recited in claim 7, further comprising the step of: pulverizing the carbon powder and the silicon powder when mixing/dispersing to provide the powder mixture, wherein the pulverizing and the mixing/dispersing are performed using a ball mill.

11. The manufacturing method of a ceramic matrix composite as recited in claim 7, wherein temperature rising around a silicon melting point to a temperature sufficient for reaction calcining is slowly controlled under 1 degree C./min.

* * * * *